(12) United States Patent
Komamine

(10) Patent No.: US 12,136,119 B2
(45) Date of Patent: Nov. 5, 2024

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Satoshi Komamine, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 403 days.

(21) Appl. No.: 17/523,081

(22) Filed: Nov. 10, 2021

(65) Prior Publication Data

US 2022/0156818 A1 May 19, 2022

(30) Foreign Application Priority Data

Nov. 19, 2020 (JP) ................................ 2020-192370

(51) Int. Cl.
*G06Q 30/00* (2023.01)
*G06Q 10/087* (2023.01)
*G06Q 30/0601* (2023.01)
*G06K 7/10* (2006.01)

(52) U.S. Cl.
CPC ....... *G06Q 30/0633* (2013.01); *G06Q 10/087* (2013.01); *G06K 7/10009* (2013.01)

(58) Field of Classification Search
None
See application file for complete search history.

(56) References Cited

U.S. PATENT DOCUMENTS

| 2005/0075954 | A1 | 4/2005 | Matsumoto et al. |
| 2018/0137460 | A1* | 5/2018 | Stiefel .................. G06Q 10/087 |
| 2018/0293543 | A1* | 10/2018 | Tiwari .................. H04W 4/023 |
| 2020/0013002 | A1 | 1/2020 | Hayashi et al. |
| 2020/0364660 | A1* | 11/2020 | Hines ..................... G16H 20/13 |
| 2023/0094353 | A1* | 3/2023 | Iwase .................. G06Q 10/087 |
| | | | 705/28 |

FOREIGN PATENT DOCUMENTS

| JP | 2003-091665 A | 3/2003 |
| JP | 2005-112499 A | 4/2005 |
| JP | 2015-125535 A | 7/2015 |
| JP | 2020-008331 A | 1/2020 |

* cited by examiner

*Primary Examiner* — Mila Airapetian
(74) *Attorney, Agent, or Firm* — Oliff PLC

(57) ABSTRACT

An information processing device includes a processor configured to manage a stock quantity of products purchased and stored in a predetermined storage place that is associated with a user, based on information about a first product acquired from an electronic tag attached to the first product. The processor acquires information about the first product from the electronic tag of the first product stored in the predetermined storage place and acquires a quantity of the first product, detects that a second product to which the electronic tag is not attached is to get mixed in the predetermined storage place, based on purchase information indicating a purchase action of the user, and manages, in a case where the second product is present in a mixed manner in the predetermined storage place, the stock quantity of products stored in the predetermined storage place.

20 Claims, 9 Drawing Sheets

FIG. 4

STOCK INFORMATION TABLE

| PRODUCT ID | INDIVIDUAL ID | TAG | UPDATE DATE/TIME |
|---|---|---|---|
| T001 | X001 | PRESENCE | YYYY:MM:DD:HH:MM:SS |
| T002 | Y001 | ABSENCE | YYYY:MM:DD:HH:MM:SS |
| | | | |
| | | | |

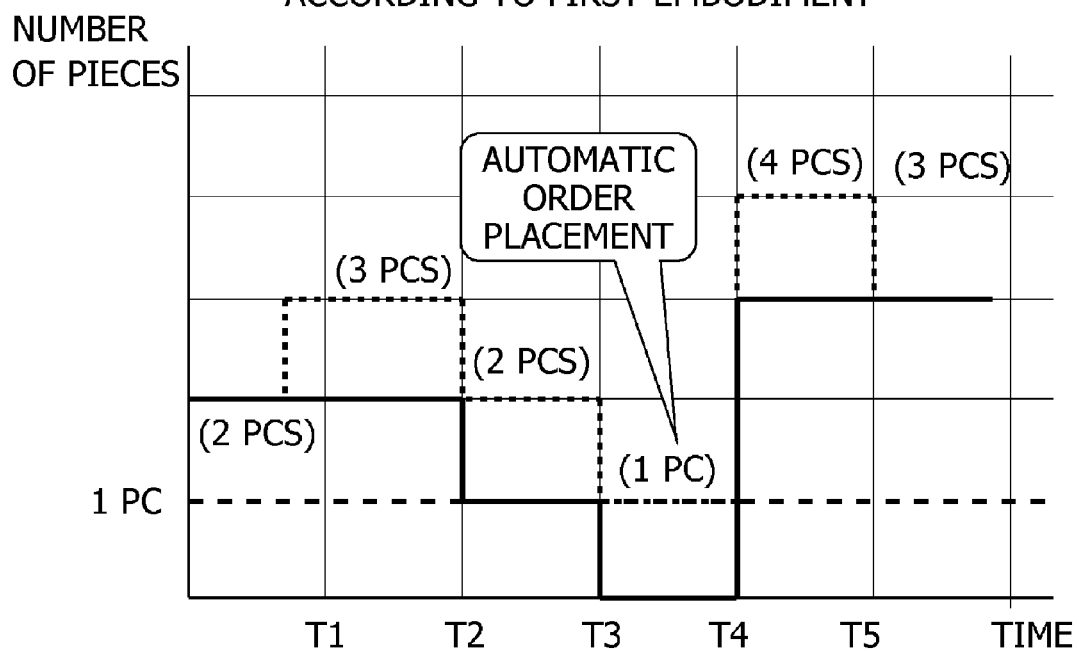

INFORMATION PROCESSING DEVICE AND INFORMATION PROCESSING METHOD

CROSS REFERENCE TO THE RELATED APPLICATION

This application claims the benefit of Japanese Patent Application No. 2020-192370, filed on Nov. 19, 2020, which is hereby incorporated by reference herein in its entirety.

BACKGROUND

Technical Field

The present disclosure relates to an information processing device and an information processing method.

Description of the Related Art

There is disclosed a stock management system for managing stock based on measurement data from a weight sensor that measures a weight of products placed on a top board of a housing, and for placing an order for the products when a remaining quantity falls below an appropriate stock quantity (for example, Patent Document 1).

CITATION LIST

Patent Document

[Patent Document 1] Japanese Patent Laid-Open No 2020-008331

However, in relation to stock management using electronic tags such as RFIDs, for example, a case is conceivable where products to which electronic tags are not attached are present in a storage place in a mixed manner, and there is no disclosure about a technology for stock management for such a case.

An aspect of the disclosure is aimed at providing an information processing device and an information processing method for stock management using electronic tags, where stock management may be accurately performed even in a case where products to which electronic tags are not attached are present in a mixed manner.

SUMMARY

An aspect of the present disclosure is an information processing device comprising a processor configured to manage a stock quantity of products purchased and stored in a predetermined storage place that is associated with a user, based on information about a first product to which an electronic tag is attached, the information being acquired from the electronic tag of the first product through short-range wireless communication with the electronic tag, wherein
the processor is configured to:
acquire, from the electronic tag of the first product, the information about the first product stored in the predetermined storage place, and acquire a quantity of the first product stored in the predetermined storage place,
detect that a second product to which the electronic tag is not attached or in relation to which whether the electronic tag is attached or not is unknown is to get mixed in the predetermined storage place, based on purchase information indicating a purchase action of the user, and
manage, in a case where the second product is present in a mixed manner in the predetermined storage place, the stock quantity of products stored in the predetermined storage place, based on the quantity of the first product and a quantity of the second product stored in the predetermined storage place.

Another aspect of the present disclosure is an information processing method comprising managing a stock quantity of products purchased and stored in a predetermined storage place that is associated with a user, based on information about a first product to which an electronic tag is attached, the information being acquired from the electronic tag of the first product through short-range wireless communication with the electronic tag, wherein
the information processing method includes:
acquiring, from the electronic tag of the first product, the information about the first product stored in the predetermined storage place, and acquiring a quantity of the first product stored in the predetermined storage place,
detecting that a second product to which the electronic tag is not attached or in relation to which whether the electronic tag is attached or not is unknown is to get mixed in the predetermined storage place, based on purchase information indicating a purchase action of the user, and
managing, in a case where the second product is present in a mixed manner in the predetermined storage place, the stock quantity of products stored in the predetermined storage place, based on the quantity of the first product and a quantity of the second product stored in the predetermined storage place.

Another aspect of the present disclosure is an information processing device comprising a processor configured to manage a stock quantity of products purchased and stored in a predetermined storage place that is associated with a user, based on information about a first product to which an electronic tag is attached, the information being acquired from the electronic tag of the first product through short-range wireless communication with the electronic tag, wherein
the processor is configured to:
detect that a second product to which the electronic tag is not attached or in relation to which whether the electronic tag is attached or not is unknown is to get mixed in the predetermined storage place, based on purchase information indicating a purchase action of the user, and
issue a notification that the second product is to get mixed in the predetermined storage place, to the user associated with the predetermined storage place, in a case where the second product is detected to get mixed in the predetermined storage place.

According to an aspect of the present disclosure, in relation to stock management using electronic tags, stock management may be accurately performed even in a case where products to which electronic tags are not attached are present in a mixed manner.

BRIEF DESCRIPTION OF THE DRAWINGS

FIG. 4 is an example of the information held in the stock information DB;

FIG. 9 is a diagram illustrating an example of a shift in the number of products stored in the repository and managed by the stock management system according to the first embodiment.

DESCRIPTION OF THE EMBODIMENTS

Figure 1:
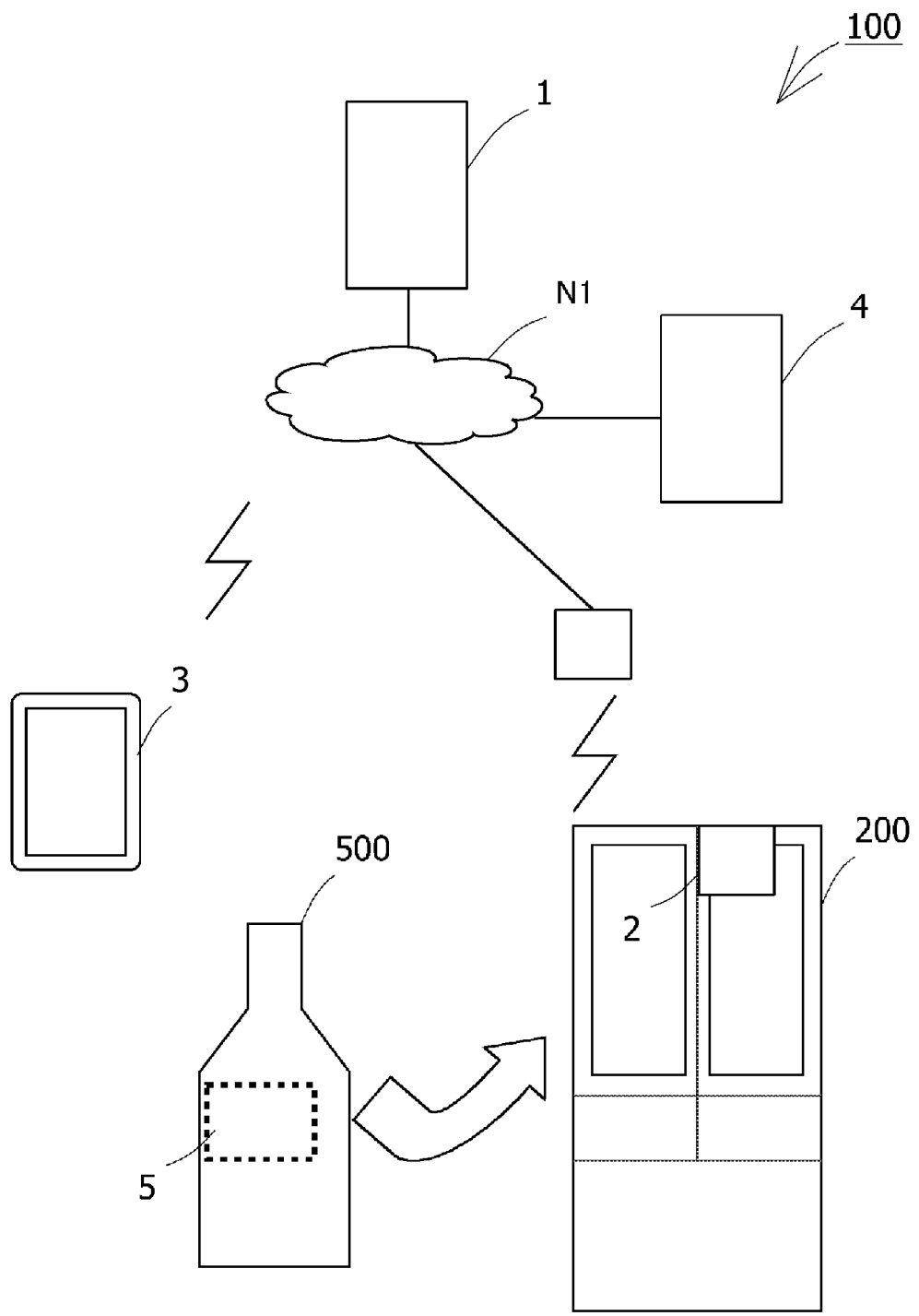
FIG. 1 is a diagram illustrating an example configuration of a stock management system according to a first embodiment.

An aspect of the present disclosure is an information processing device including a processor configured to manage a stock quantity of products purchased and stored in a predetermined storage place that is associated with a user, based on information about a first product that is acquired from an electronic tag of the first product through short-range wireless communication with the electronic tag. The processor may acquire, from the electronic tag of the first product, the information about the first product stored in the predetermined storage place, and may acquire a quantity of the first product stored in the predetermined storage place. The processor may detect that a second product to which the electronic tag is not attached or in relation to which whether the electronic tag is attached or not is unknown is to get mixed in the predetermined storage place, based on purchase information indicating a purchase action of the user. Furthermore, the processor may manage, in a case where the second product is present in a mixed manner in the predetermined storage place, the stock quantity of products stored in the predetermined storage place, based on the quantity of the first product and a quantity of the second product stored in the predetermined storage place.

The information processing device may be a server, for example. The information processing device may alternatively be a personal computer (PC) present in the predetermined storage place, a computer that connects to a reader for the electronic tag, and the like. The predetermined storage place may be a storage shelf or a repository in the home of a user, an office, or a factory, for example. The electronic tag may be an RF tag, for example. In an aspect of the present disclosure, the second product to which the electronic tag is not attached may include a product in relation to which whether the electronic tag is attached or not is unknown. Additionally, the first product and the second product may be products of a same type but of different brands. The purchase information may be POS data of a physical store, a product order history at an online store, or a delivery completion notification for a product, for example.

According to an aspect of the present disclosure, in relation to stock management, using electronic tags, of products stored in a storage place, stock management may be more accurately performed even in a case where products to which electronic tags are not attached are present in a mixed manner.

In an aspect of the present disclosure, the processor may place an order for the first product or a predetermined product of a same type as the first product, in a case where a first stock quantity that is a total of the quantity of the first product and the quantity of the second product stored in the predetermined storage place falls to or below a first threshold. The first threshold is variable depending on the type of product. The stock quantity of products may thereby be automatically maintained, and stock shortage may be avoided. Furthermore, burden of stock management may be reduced.

In an aspect of the present disclosure, the processor may issue an inquiry to the user associated with the predetermined storage place as to whether to place an order for the first product or a predetermined product of a same type as the first product, in a case where the quantity of the first product stored in the predetermined storage place falls to or below a second threshold. Because an order is placed when confirmed by the user, placement of an order for unnecessary products may be reduced.

In an aspect of the present disclosure, the processor may acquire, based on the purchase information, a quantity of the second product that is newly stored in the predetermined storage place, and update the quantity of the second product stored in the predetermined storage place. The purchase information is based on a factual event, that is, a purchase action of the user, and using the purchase information enables the quantity of the second product stored in the predetermined storage place to be more accurately grasped.

In an aspect of the present disclosure, the processor may reset the quantity of the second product stored in the predetermined storage place, in a case where it is confirmed by the user associated with the predetermined storage place that the second product is not stored in the predetermined storage place. Furthermore, the processor may update the quantity of the second product stored in the predetermined storage place by excluding a quantity of the second product for which there is a lapse of a predetermined period of time after getting mixed in the predetermined storage place. The predetermined period of time is a period of time until an expiry date of the second product, for example. The quantity of the second product stored in the predetermined storage place may thus be more accurately grasped.

In an aspect of the present disclosure, the processor may issue a notification that the second product is to get mixed in the predetermined storage place, to the user associated with the predetermined storage place, in a case where the second product is detected to get mixed in the predetermined storage place. The user may thus be alerted of a possibility that movement of products in and out of the predetermined storage place is not accurately grasped due to mixing, in the storage place, of products to which tags are not attached. Moreover, such a notification may motivate the user not to store in the predetermined storage place a product to which a tag is not attached.

In an aspect of the present disclosure, the processor may issue to the user associated with the predetermined storage place, together with the notification that the second product is to get mixed in the predetermined storage place, an inquiry as to whether to store the second product in the predetermined storage place. A product to which a tag is not attached may thus be definitely mixed in the predetermined storage place.

Another aspect of the present disclosure may be specified as an information processing method. The information processing method includes managing a stock quantity of products purchased and stored in a predetermined storage place that is associated with a user, based on information about a first product to which an electronic tag is attached, the information being acquired from the electronic tag of the first product through short-range wireless communication with the electronic tag. The information processing method includes: acquiring, from the electronic tag of the first product, the information about the first product stored in the predetermined storage place, and acquiring a quantity of the first product stored in the predetermined storage place, detecting that a second product to which the electronic tag is not attached or in relation to which whether the electronic tag is attached or not is unknown is to get mixed in the predetermined storage place, based on purchase information indicating a purchase action of the user, and managing, in a case where the second product is present in a mixed manner in the predetermined storage place, the stock quantity of products stored in the predetermined storage place, based on the quantity of the first product and a quantity of the second product stored in the predetermined storage place.

Furthermore, another aspect of the present disclosure may be an information processing device including a processor configured to manage a stock quantity of products purchased and stored in a predetermined storage place that is associated with a user, based on information about a first product to which an electronic tag is attached, the information being acquired from the electronic tag of the first product through short-range wireless communication with the electronic tag, where the processor is configured to: detect that a second product to which the electronic tag is not attached or in relation to which whether the electronic tag is attached or not is unknown is to get mixed in the predetermined storage place, based on purchase information indicating a purchase action of the user associated with the predetermined storage place, and issue a notification that the second product is to get mixed in the predetermined storage place, to the user, in a case where the second product is detected to get mixed in the predetermined storage place.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example configuration of a stock management system 100 according to a first embodiment. For example, the stock management system 100 is a system for managing stock of purchased products to which RF tags are attached, and that are stored in a predetermined repository at home of a user or the like. The stock management system 100 includes a management server 1, a sensor device 2 provided on a repository 200, and a user terminal 3 of a user who is associated with the sensor device 2. Additionally, in the example illustrated in FIG. 1, the repository 200 is installed at home of the user. The repository 200 is an example of "predetermined storage place". Alternatively, "predetermined storage place" may be a repository that is installed in an office, a factory or the like, for example.

A network N1 is a public network such as the Internet, for example. The management server 1, the sensor device 2, and the user terminal 3 are connected to the network N1. The sensor device 2 and the user terminal 3 are capable of communicating with the management server 1 over the network N1.

For example, the sensor device 2 is a control device that includes a reader for an RF tag that is an example of an electronic tag. The sensor device 2 may be integrated and sold together with the repository 200, or may be singly sold to be attached to the repository 200 later. The sensor device 2 connects to the network N1 by wirelessly connecting to a relay device installed at home, for example.

An RF tag 5 is attached or embedded in an object to be stored in the repository 200, for example. Objects to be stored in the repository 200 include, but are not limited to, foodstuffs such as beverages, food and seasonings, daily necessities, detergents, and the like, for example. The sensor device 2 emits an RFID radio signal every predetermined period of time and communicates with the RF tag 5 of an object stored in the repository 200 to acquire identification information of the object. For example, the identification information of an object acquired from the RF tag 5 includes identification information of a product corresponding to the object and an individual identification number. The sensor device 2 transmits, to the management server 1, detected stock information including the acquired identification information of the object stored in the repository 200. In the case where a plurality of objects with the RF tags 5 are stored in the repository 200, the detected stock information includes the identification information pieces for the plurality of objects.

When the detected stock information is received from the sensor device 2, the management server 1 compares the received detected stock information against stock information including information about an object stored in the repository 200 that is already grasped by the management server 1. In the case where an object not included in the stock information is included in the received detected stock information, the management server 1 detects that the object is newly stored in the repository 200, and adds information about the object in the stock information. In the case where an object not included in the detected stock information is included in the stock information, the management server 1 detects removal of the object from the repository 200, and deletes information about the object from the stock information. In this manner, the stock management system 100 manages stock inside the repository 200 by using RFIDs.

In the first embodiment, in the case where an object 500 to which an RF tag is not attached or in relation to which whether an RF tag is attached or not is unknown is mixed, stock management is performed also taking into account the quantity of the object 500. Generally, a term "object" refers to an object that is purchased, and a term "product" refers to an object that is being sold, but in the present specification, the term "product" will be used without distinguishing between the terms. In the following, objects and products to which RF tags are attached will be referred to as "tagged product". Objects and products to which RF tags are not attached or in relation to which whether RF tags are attached or not is not known will be referred to as "untagged product". The object 500 is an untagged product. Moreover, the quantity of products is expressed by the number of pieces, weight, net contents or the like, depending on the embodiment.

For example, when a user purchases a product from a physical store or an online store, POS data of the physical store, purchase history information at the online store, or a delivery completion notification from a delivery company is transmitted, as the purchase information, from an external server 4 managing such information pieces to the management server 1. When a purchased item indicated by the purchase information is detected to be an untagged product, the management server 1 transmits, to the user terminal 3, a notification that an untagged product will possibly be brought home. Together with the notification, the management server 1 transmits an inquiry as to whether the untagged product is to be stored in the repository 200, to the user terminal 3.

When a response indicating that the untagged product is to be stored in the repository 200 is received from the user terminal 3, the management server 1 adds information about the untagged product to the stock information. Then, the management server 1 performs stock management by monitoring the quantity of untagged products and the quantity of tagged products stored in the repository 200. In the following, products to be stored in the repository 200 will be assumed to be products of one article for the sake of simplicity. Additionally, the products to be stored in the repository 200 may be of different brands and with different net contents, for example, as long as the products are of the same article. Specifically, wine is stored in the repository 200, and brands, net contents and the like of a plurality of bottles of wine stored in the repository 200 may be different.

In the first embodiment, in the case where a total of the quantity of untagged products and the quantity of tagged products stored in the repository 200 falls to or below a first threshold, the management server 1 performs stock management by placing an order to a predetermined shop for a product of the same article and of a predetermined brand.

According to the first embodiment, stock management is performed by also taking into account the quantity of untagged products stored in the repository 200, and thus, stock management may be performed while accurately grasping the quantity of products actually stored in the repository 200.

Figure 2:
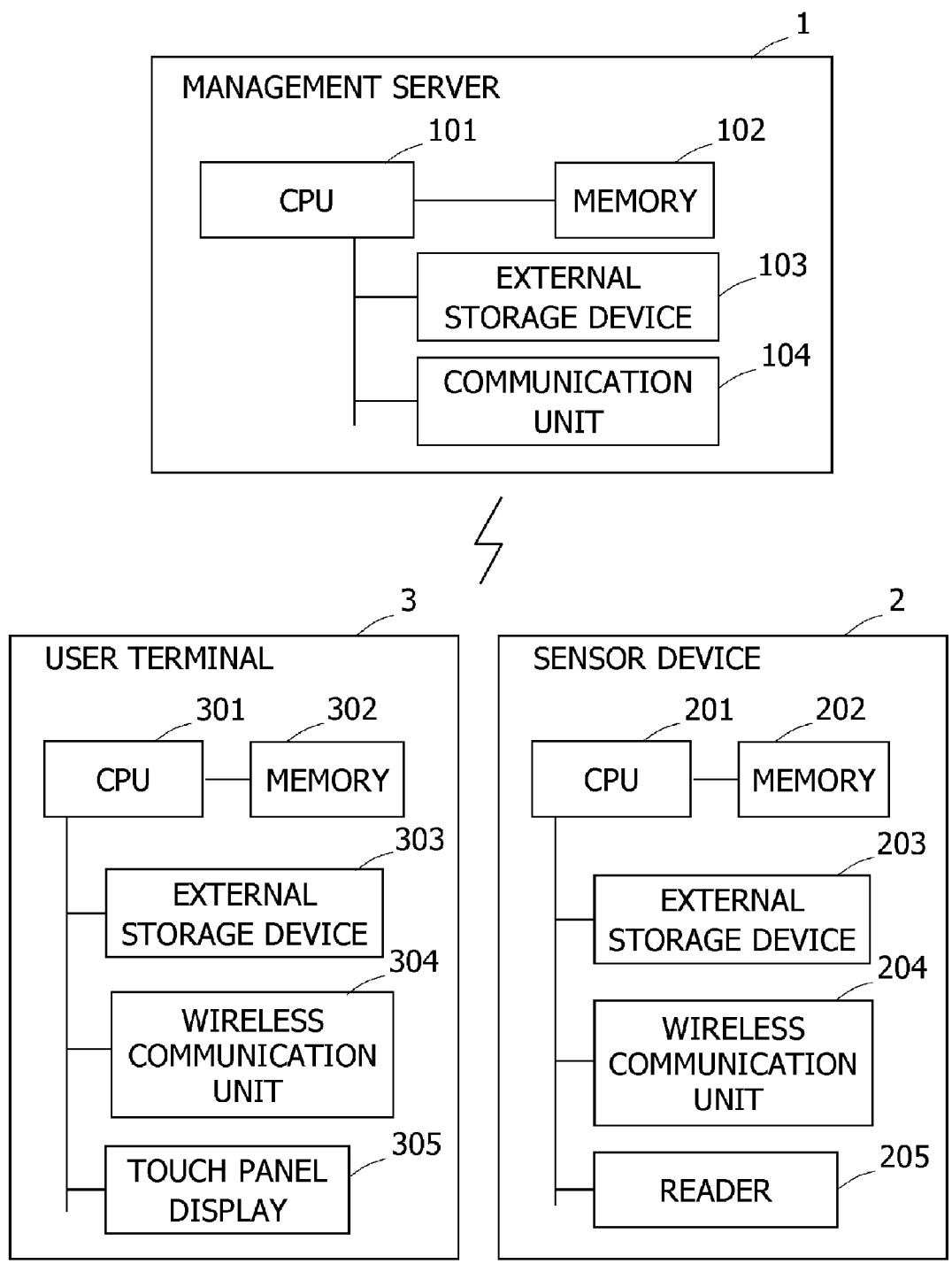
FIG. 2 is a diagram illustrating an example of a hardware configuration of the management server, the sensor device, and the user terminal according to the first embodiment.

FIG. 2 is a diagram illustrating an example of a hardware configuration of the management server 1, the sensor device 2, and the user terminal 3 according to the first embodiment. As hardware components, the management server 1 includes a central processing unit (CPU) 101, a memory 102, an external storage device 103, and a communication unit 104. The memory 102 and the external storage device 103 are each a computer-readable recording medium. The management server 1 is an example of "information processing device".

The external storage device 103 stores various programs, and data to be used by the CPU 101 at the time of execution of each program. For example, the external storage device 103 is an erasable programmable ROM (EPROM) and/or a hard disk drive. Programs to be held in the external storage device 103 include an operating system (OS), a control program of the stock management system 100, and various other application programs, for example. The control program of the stock management system 100 is a program for performing stock management in relation to the repository 200.

The memory 102 is a main memory that provides the CPU 101 with a work area and a storage area where programs stored in the external storage device 103 are loaded, and that is used as a buffer, for example. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one and may be more than one. The CPU 101 is an example of "processor".

The communication unit 104 is an interface through which information is input/output to/from the network. For example, the communication unit 104 is a local area network (LAN) card. However, the communication unit 104 is not limited thereto, and may alternatively be an optical network unit (ONU) interface for an optical communication network, for example. The hardware configuration of the management server 1 is not limited to the one illustrated in FIG. 2.

As hardware components, the sensor device 2 includes a CPU 201, a memory 202, an external storage device 203, a wireless communication unit 204, and a reader 205. The CPU 201, the memory 202, and the external storage device 203 are the same as the CPU 101, the memory 102, and the external storage device 103, respectively.

The wireless communication unit 204 is an interface through which information is input/output to/from the network. For example, the wireless communication unit 204 accesses the network N1 and communicates with the management server 1 by performing wireless communication through WiFi, Bluetooth (registered trademark) Low Energy (BLE) or the like and connecting to a relay device such as an access point installed at home of the user, for example.

The reader 205 is a reader for RF tags, for example. The reader 205 emits radio waves for short-range wireless communication every predetermined period of time, and receives a reflected wave from the RF tag 5, for example. The reflected wave from the RF tag 5 includes identification information recorded in the RF tag 5. When the identification information included in the reflected wave from the RF tag 5 is acquired, the reader 205 outputs the same to the CPU 201.

Next, the user terminal 3 includes, as hardware components, a CPU 301, a memory 302, an external storage device 303, a wireless communication unit 304, and a touch panel display 305. The CPU 301, the memory 302, and the external storage device 303 are the same as the CPU 101, the memory 102, and the external storage device 103, respectively. The external storage device 303 stores a client application program of the stock management system 100.

The wireless communication unit 304 connects to the network N1 by a predetermined wireless communication scheme. For example, the wireless communication unit 304 performs wireless communication by a mobile wireless communication scheme such as long term evolution (LTE), LTE-Advanced, 5G or the like, or wireless communication through WiFi or the like.

The touch panel display 305 receives an operation input from the user, and outputs the same to the CPU 301. Furthermore, the touch panel display 305 displays an image that is input from the CPU 301. Additionally, the example of the hardware configuration of the management server 1, the sensor device 2, and the user terminal 3 illustrated in FIG. 2 is merely an example and is not restrictive.

Figure 3:
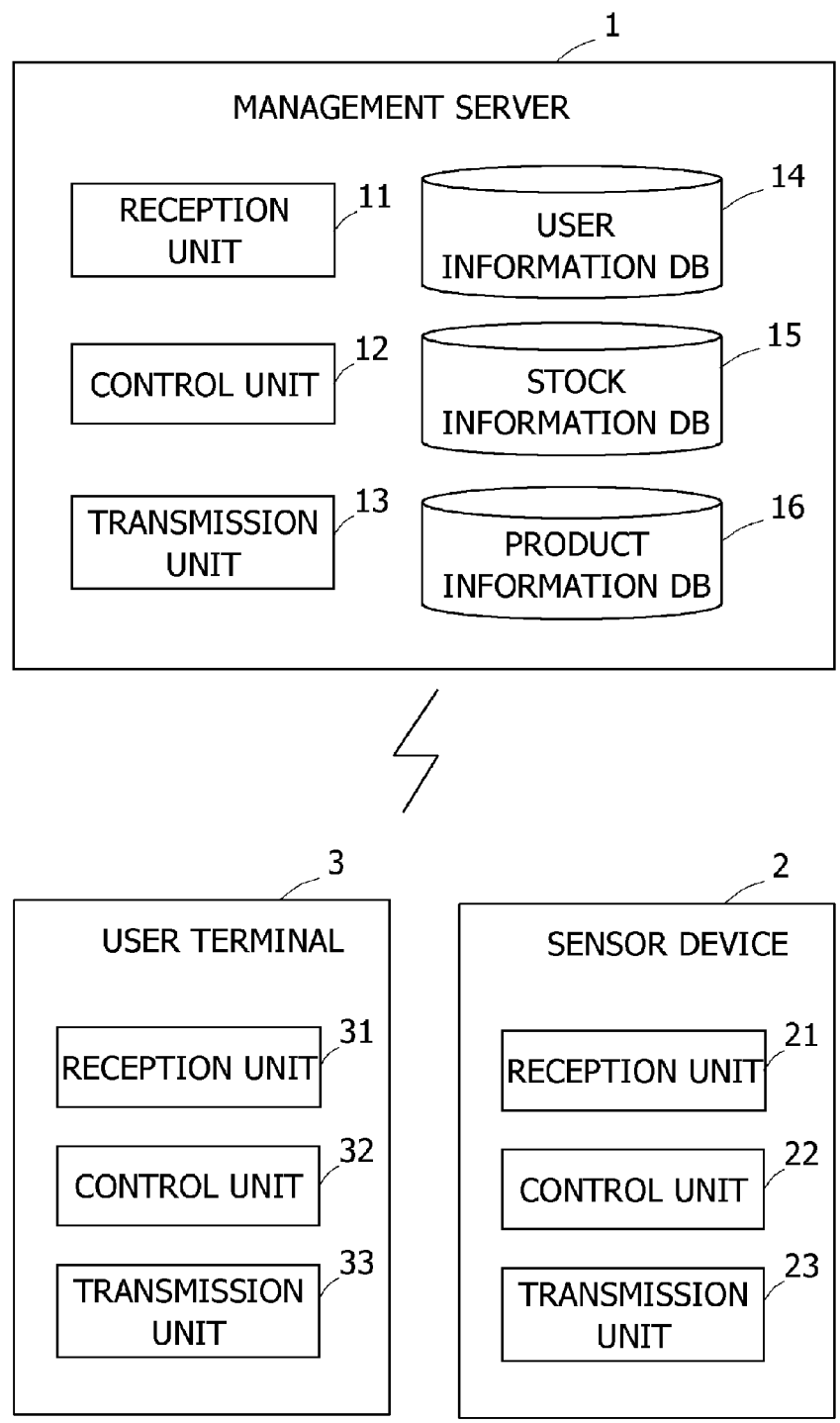
FIG. 3 is a diagram illustrating an example of a functional configuration of the management server, the sensor device, and the user terminal according to the first embodiment.

FIG. 3 is a diagram illustrating an example of a functional configuration of the management server 1, the sensor device 2, and the user terminal 3 according to the first embodiment. First, the sensor device 2 includes, as functional components, a reception unit 21, a control unit 22, and a transmission unit 23. These functional components are implemented by the CPU 201 of the sensor device 2 executing predetermined programs in the external storage device 203.

The reception unit 21 and the transmission unit 23 are interfaces to the management server 1. The transmission unit 23 transmits data input from the control unit 22 to the management server 1 through the wireless communication unit 204. The reception unit 21 receives data from the management server 1 through the wireless communication unit 204, and outputs the received data to the control unit 22.

The control unit 22 receives from the reader 205, every predetermined period of time, input of identification information of at least one tagged product stored in the repository 200, read from the RF tag 5 of the at least one tagged product. Each period of time when the reader 205 emits an RFID radio signal is arbitrarily set in the range of several seconds to one minute, for example. When the identification information of the at least one tagged product stored in the repository 200 is input from the reader 205, the control unit 22 creates the detected stock information, and transmits the same to the management server 1 through the transmission unit 23. The detected stock information includes identification information of the sensor device 2, a timestamp, and the identification information of the at least one tagged product stored in the repository 200, for example.

Next, the management server 1 includes, as functional components, a reception unit 11, a control unit 12, a transmission unit 13, a user information DB 14, a stock information DB 15, and a product information DB 16. These functional components are implemented by the CPU 101 executing the control program of the stock management system 100.

The reception unit 11 and the transmission unit 13 are interfaces to the network N1. For example, the reception unit 11 receives data from the sensor device 2, the user terminal 3, and the external server 4 through the network N1, and outputs the data to the control unit 12. The transmission unit 13 transmits data input from the control unit 12 to the user terminal 3 through the network N1.

When detected stock information is received from the sensor device 2 through the reception unit 11, the control unit 12 compares the received detected stock information and the stock information from the corresponding sensor device 2 stored in the stock information DB 15, and updates the stock information DB 15 based on the difference. For example, in the case where there is a tagged product that is not in the stock information from the sensor device 2 but is newly present in the received detected stock information, the control unit 12 determines that the tagged product is newly stored in the repository 200, and adds information about the tagged product in the stock information DB 15. For example, in the case where there is a tagged product that is in the stock information from the sensor device 2 but not in the received detected stock information, the control unit 12 determines that the tagged product is removed from the repository 200, and deletes information about the tagged product from the stock information DB 15.

Furthermore, in the case where purchase information is received from the external server 4 through the reception unit 11, the control unit 12 refers to the product information DB 16, and determines whether a purchased product indicated by the purchase information is a tagged product or an untagged product. The external server 4 is a server that manages a physical store or an online store where the user is registered as a member, for example, and when the user purchases a product, the external server 4 transmits purchase information including information about the purchased product to the management server 1. For example, the purchase information includes identification information of the purchased product, the quantity of the purchased product, information about a store of purchase, and in the case of purchase from an online store, an address of a delivery destination and a scheduled delivery date.

In the case where the purchased product indicated by the purchase information is an untagged product, and the delivery destination in the case of purchase from an online store is the place where the repository 200 is disposed, that is, the home of the user, the control unit 12 detects that the purchased untagged product will be carried into the home of the user. The control unit 12 may acquire position information of the user terminal 3, and may detect that a purchased untagged product will be carried into the home of the user, if the purchased product indicated by the purchase information is an untagged product, the store of purchase indicated by the purchase information is a physical store, and the position information of the user terminal 3 indicates movement to the home of the user after purchase is made.

In the case where the purchased untagged product is detected to be carried into the home of the user, the control unit 12 transmits a notification indicating mixing of the untagged product to the user terminal 3. The notification indicating mixing of the untagged product is for notifying of a possibility of the untagged product getting mixed in the repository 200. An inquiry for checking whether the untagged product is to be stored in the repository 200 is transmitted together with the notification indicating mixing of the untagged product. In the case where information indicating that the untagged product is to be stored in the repository 200 is received from the user terminal 3 as a response to the inquiry for checking whether the untagged product is to be stored in the repository 200, the control unit 12 adds information about the untagged product to the stock information DB 15.

Furthermore, the control unit 12 checks the quantity of products stored in the repository 200 at a predetermined timing. The timing of checking the quantity of products stored in the repository 200 is a predetermined timing in a period that is arbitrarily set in the range of one day to one week, and a time of occurrence of a predetermined event, for example. The predetermined event is detection of a possibility of mixing of an untagged product, for example.

As the quantity of products stored in the repository 200, the control unit 12 determines a total value M+m of a quantity M (M≥0) of tagged products and a quantity m (m≥0) of untagged products. In the case where the quantity M+m of products stored in the repository 200 falls to or below the first threshold, the control unit 12 automatically places an order for the tagged product or a predetermined product of the same article as the tagged product. A product to be ordered, the quantity of product to be ordered, and an order destination are set by the user in advance in relation to the automatic order placement.

Furthermore, in the case where the quantity M of tagged products stored in the repository 200 falls to or below a second threshold, the control unit 12 transmits an inquiry for checking whether an order may be automatically placed, to the user terminal 3. The second threshold may take a same value as the first threshold, or may take a different value. When a permission response for automatic order placement is received from the user terminal 3, the control unit 12 performs automatic order placement.

Furthermore, in the case where the stock information DB 15 includes information about an untagged product for which there is a lapse of a predetermined period of time after being stored in the repository 200, the control unit 12 determines that the untagged product is removed from the repository 200, and deletes the information about the untagged product from the stock information DB 15. The predetermined period of time used to determine deletion of information about an untagged product from the stock information DB 15 is a period of time until an expiry date, a best before date or a use-by date of the untagged product or a predetermined period of time that is set by the user in advance, for example.

The user information DB 14, the stock information DB 15, and the product information DB 16 are created in a storage area of the external storage device 103 of the management server 1. The user information DB 14 holds information about a user. For example, information about a user includes identification information of the user, the identification information of the sensor device 2, name and address of the user, information indicating a contact destination of the user terminal 3, and information about automatic order placement. Information about automatic order placement includes identification information of a product to be ordered automatically, the quantity of products to be ordered automatically, and information about an order destination of the automatic order placement, for example. Additionally, in the first embodiment, the repository 200 is assumed to be installed at the home of the user, and thus, the address of the user included in the user information is the position of the repository 200 and is the delivery destination of an automatically placed order. In the case where the repository 200 is installed at other than the home of the user, the user information includes an installation position of the repository 200 instead of the address of the user, and the delivery destination of an automatically placed order is also the installation position of the repository 200.

The stock information DB 15 holds information about a product stored in the repository 200 of each user. Details of the information held in the stock information DB 15 will be given later. The product information DB 16 stores information about a product. Information about a product held in the product information DB 16 includes identification information of the product, absence/presence of the RF tag, and the expiry date or the use-by date (if set), for example.

Next, the user terminal 3 includes, as functional components, a reception unit 31, a control unit 32, and a transmission unit 33. These functional components are implemented by the CPU 301 executing the client application program of the stock management system 100.

The reception unit 31 and the transmission unit 33 are interfaces to the management server 1. The transmission unit 33 transmits data input from the control unit 32 to the management server 1 through the wireless communication unit 304. The reception unit 31 receives data from the management server 1 through the wireless communication unit 304, and outputs the received data to the control unit 32.

The control unit 32 displays, on the touch panel display 305, a notification received from the management server 1 through the reception unit 31, for example, and transmits a response input by the user through the touch panel display 305 to the management server 1 through the transmission unit 33.

Additionally, the functional configurations of the management server 1, the sensor device 2, and the user terminal 3 are not limited to those illustrated in FIG. 3. For example, some of the processes by the management server 1 may be performed by the sensor device 2.

FIG. 4 is an example of the information held in the stock information DB 15. The stock information DB 15 holds a stock information table for each user. The stock information table includes the following fields: product ID, individual ID, tag, and update date/time.

Identification information of a product is stored in the field "product ID". Individual identification information of the product is stored in the field "individual ID". Information indicating presence/absence of an RF tag is stored in the field "tag". A last time when the product was confirmed to be stored in the repository 200 is stored in the field "update date/time".

In the case of a tagged product, the identification information and the individual identification information of the product are acquired from the RF tag 5 and are communicated by the detected stock information from the sensor device 2, and thus, the identification information pieces communicated by the detected stock information are stored in the fields "product ID" and "individual ID", respectively. Furthermore, in the case of the tagged product, information indicating that a tag is present is stored in the field "tag". In the case of the tagged product, a timestamp included in the detected stock information including the product is stored in the field "update date/time".

In the case of an untagged product, the identification information and the individual identification information of the product are acquired from the purchase information, and thus, the identification information pieces of the product communicated by the purchase information are stored in the fields "product ID" and "individual ID", respectively. In the case where the individual identification information of the product is not included in the purchase information, the control unit 12 may assign the individual identification information to the untagged product, and this individual identification information may be stored in the field "individual ID". Furthermore, in the case of the untagged product, information indicating absence of a tag is stored in the field "tag". In the case of the untagged product, a date/time when purchase information including the product is received is stored in the field "update date/time", for example.

In the case where the detected stock information is received from the sensor device 2, the control unit 12 updates, for a tagged product that is present in both the detected stock information and the stock information table, the field "update date/time" in the stock information table by the timestamp included in the detected stock information. In relation to a tagged product that is present in the detected stock information but not in the stock information table, the control unit 12 registers the tagged product in the stock information table. At this time, the control unit 12 stores the identification information, the individual identification information, and a value of the timestamp associated with the product included in the detected stock information in the respective fields of "product ID", "individual ID", and "update date/time". Furthermore, the control unit 12 stores information indicating presence of a tag in the field "tag". In relation to a tagged product that is present in the stock information table but not in the detected stock information, the control unit 12 deletes the entry for the tagged product from the stock information table.

In the case where purchase information is received from the external server 4, and a response indicating that an untagged product included in the purchase information is to be stored in the repository 200 is received from the user terminal 3, the control unit 12 registers the untagged product in the stock information table. At this time, the control unit 12 stores the identification information of the product included in the purchase information and the individual identification information included in the purchase information or the individual identification information assigned by the control unit 12 in the respective fields of "product ID" and "individual ID". Furthermore, the control unit 12 indicates information indicating absence of a tag in the field "tag". For example, the control unit 12 stores a reception date/time of the purchase information or a reception date/time of the response from the user terminal 3 in the field "update date/time".

Moreover, in the case where a response indicating that an untagged product is not stored in the repository 200 is received from the user terminal 3, the control unit 12 deletes all entries for untagged products from the stock information table. Furthermore, the control unit 12 deletes, from the stock information table, an entry for an untagged product for which there is a lapse of a predetermined period of time from the date/time indicated by the value in the field "update date/time".

Additionally, information pieces to be held in the stock information table are not limited to those illustrated in FIG. 4. Furthermore, the methods of registration, update and deletion of an entry from the stock information table are not limited to the methods described above.

<Flow of Processes>

Figure 5:
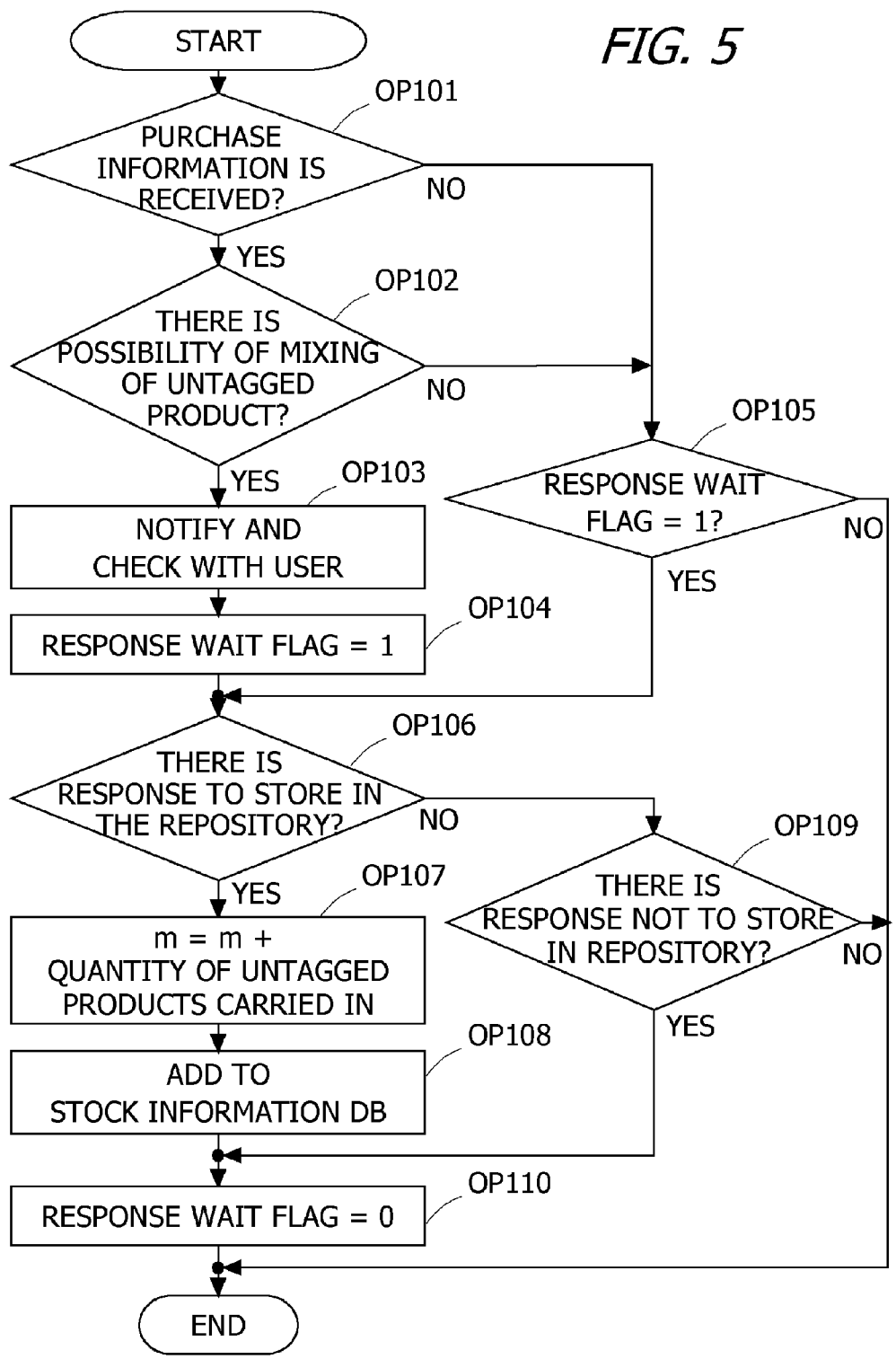
FIG. 5 is an example of a flowchart of an untagged product detection process by the management server.

FIG. 5 is an example of a flowchart of an untagged product detection process by the management server 1. The process illustrated in FIG. 5 is repeated every predetermined period of time. The performer of the process illustrated in FIG. 5 is the CPU 101, but a functional component will be described as the performer for the sake of convenience. The same applies to the subsequent flowchart.

In OP101, the control unit 12 determines whether the purchase information is received from the external server 4 through the reception unit 11. In the case where the purchase information is received from the external server 4 (OP101: YES), the process proceeds to OP102. In the case where the purchase information is not received from the external server 4 (OP101: NO), the process proceeds to OP105.

In OP102, the control unit 12 determines, based on the purchase information that is received, whether there is a possibility of an untagged product getting mixed in the repository 200. Specifically, the control unit 12 determines whether a purchased product indicated by the purchase information that is received is an untagged product, by referring to the product information DB 16. Furthermore, in the case where an address of a delivery destination is included in the purchase information that is received, the control unit 12 determines whether the address of the delivery destination is the address of the home of the user included in the user information DB 14. In the case where the purchased product indicated by the purchase information that is received is an untagged product, and the address of the delivery destination is the address of the home of the user included in the user information DB 14, the control unit 12 determines that there is a possibility of an untagged product getting mixed in the repository 200. Furthermore, the control unit 12 acquires the position information of the user terminal 3, and in the case where the purchased product indicated by the purchase information is an untagged product, the store of purchase indicated by the purchase information is a physical store, and movement to the home of the user after purchase is indicated by the position information of the user terminal 3, the control unit 12 may detect that the purchased untagged product will be carried into the home of the user.

In the case where it is determined that there is a possibility of an untagged product getting mixed in the repository 200 (OP102: YES), the process proceeds to OP103. In the case where the possibility of an untagged product getting mixed in the repository 200 is not determined (OP102: NO), the process proceeds to OP105.

In OP103, the control unit 12 transmits, to the user terminal 3, a notification that an untagged product is getting mixed, and an inquiry for checking whether to store the untagged product in the repository 200. In OP104, the control unit 12 sets a response wait flag to "1". The response wait flag "1" indicates a state of waiting for a response from the user terminal 3.

In OP105, the control unit 12 determines whether the response wait flag is "1". In the case where the response wait flag is "1" (OP105: YES), the process proceeds to OP106. In the case where the response wait flag is "0" (OP105: NO), the process illustrated in FIG. 5 is ended.

In OP106, the control unit 12 determines whether a response including information indicating that the untagged product is to be stored in the repository 200 is received from the user terminal 3. In the case where a response including information indicating that the untagged product is to be stored in the repository 200 is received from the user terminal 3 (OP106: YES), the process proceeds to OP107. In the case where a response including information indicating that the untagged product is to be stored in the repository 200 is not received from the user terminal 3 (OP106: NO), the process proceeds to OP109.

In OP107, the control unit 12 updates the quantity m of untagged products stored in the repository 200 by adding the quantity of purchased untagged products indicated by the purchase information to the current value of m. In OP108, the control unit 12 adds information about the untagged product indicated by the purchase information to the stock information DB 15.

In OP109, the control unit 12 determines whether a response including information indicating that the untagged product is not to be stored in the repository 200 is received from the user terminal 3. In the case where a response including information indicating that the untagged product is not to be stored in the repository 200 is received from the user terminal 3 (OP109: YES), the process proceeds to OP110. In the case where there is a lapse of a predetermined period of time without any response from the user terminal 3 (OP109: NO), the process illustrated in FIG. 5 is ended.

In OP110, the control unit 12 sets the response wait flag to "0". The state of waiting for a response from the user terminal 3 is thereby cancelled. Then, the process illustrated in FIG. 5 is ended.

Figure 6:
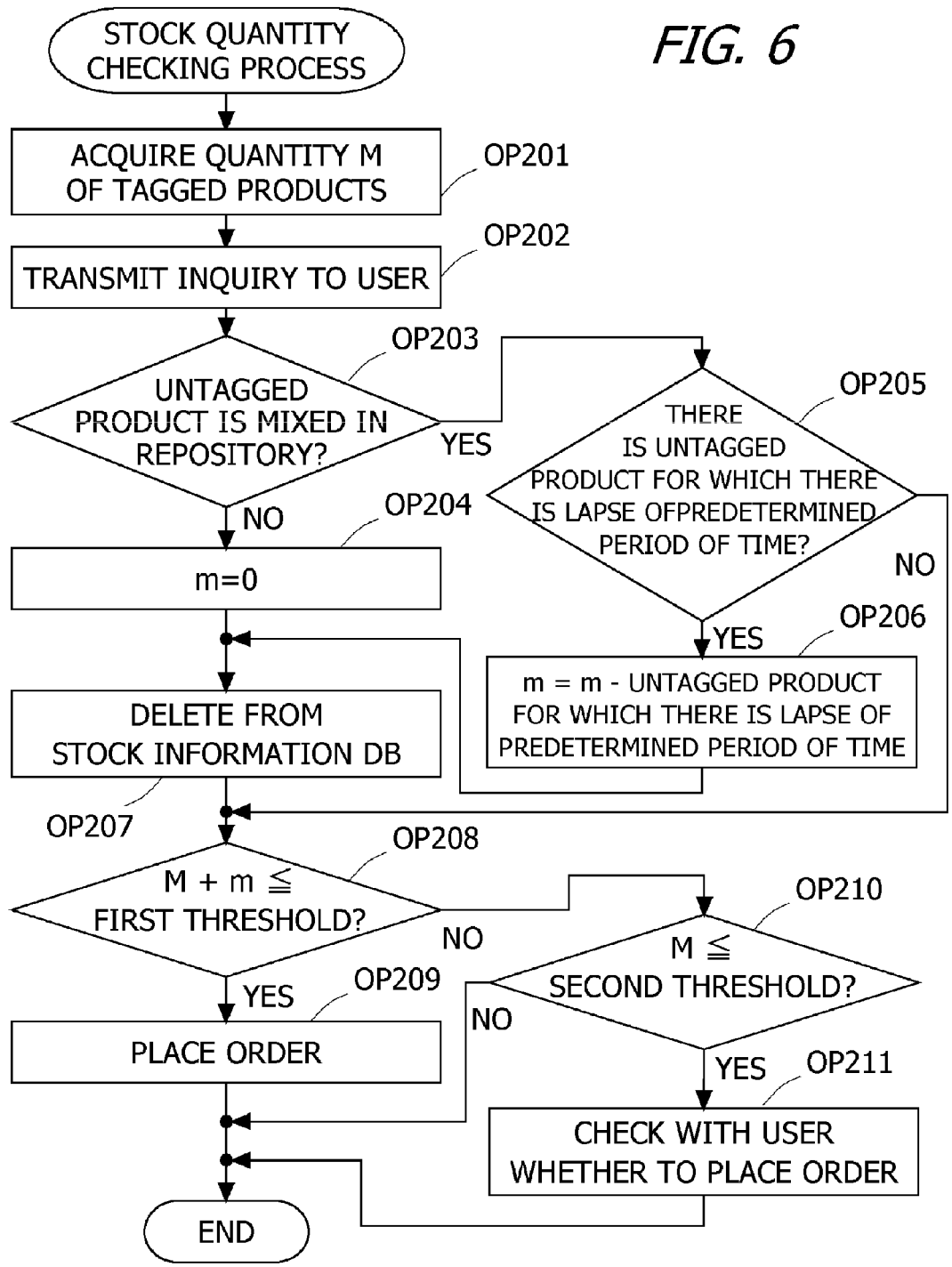
FIG. 6 is an example of a flowchart of a stock quantity checking process by the management server.

FIG. 6 is an example of a flowchart of a stock quantity checking process by the management server 1. The process illustrated in FIG. 6 is performed at a predetermined timing. For example, an execution timing of the stock quantity checking process is a predetermined time in a period that is arbitrarily set in the range of one day to one week, and a time of occurrence of a predetermined event. The predetermined event is detection of a possibility of mixing of an untagged product, for example.

In OP201, the control unit 12 acquires the quantity M of tagged products stored in the repository 200. As the quantity M of tagged products stored in the repository 200, the number of entries where information indicating presence of a tag is stored in the field "tag" may be acquired by referring to the stock information DB 15, or the quantity of products included in the latest detected stock information received from the sensor device 2 may be counted and acquired, for example.

In OP202, the control unit 12 transmits to the user terminal 3, through the transmission unit 13, an inquiry as to whether an untagged product is mixed in the repository 200. In OP203, the control unit 12 determines whether a response including information indicating that an untagged product is mixed in the repository 200 is received from the user terminal 3 through the reception unit 11.

In the case where a response including information indicating that an untagged product is not mixed in the repository 200 is received from the user terminal 3 (OP203: NO), the process proceeds to OP204. In OP204, the control unit 12 updates the quantity m of untagged products stored in the repository 200 to zero.

In the case where a response including information indicating that an untagged product is mixed in the repository 200 is received from the user terminal 3, or in the case where a response is not received from the user terminal 3 after a lapse of a predetermined period of time (OP203: YES), the process proceeds to OP205. In OP205, the control unit 12 refers to the stock information DB 15, and determines whether there is an untagged product for which there is a lapse of a predetermined period of time from the time indicated by the value in the field "update date/time".

In the case where there is an untagged product for which there is a lapse of a predetermined period of time from the time indicated by the value in the field "update date/time" (OP205: YES), the process proceeds to OP206. In OP206, the control unit 12 updates the quantity m of untagged products stored in the repository 200 by subtracting the quantity of untagged products for which there is a lapse of a predetermined period of time from the time indicated by the value in the field "update date/time". In the case where there is no untagged product for which there is a lapse of a predetermined period of time from the time indicated by the value in the field "update date/time" (OP205: NO), the process proceeds to OP208.

In OP207, the control unit 12 deletes, from the stock information DB 15, information about all the untagged products (in the case of OP203: NO), or an entry for an untagged product for which there is a lapse of a predetermined period of time from the time indicated by the value in the field "update date/time" (in the case of OP205: YES).

In OP208, the control unit 12 determines whether the quantity M+m of products stored in the repository 200 is equal to or smaller than the first threshold. In the case where the quantity M+m of products stored in the repository 200 is equal to or smaller than the first threshold (OP208: YES), the process proceeds to OP209. In OP209, the control unit 12 automatically places an order for the tagged product or a predetermined product of the same article as the tagged product set in the user information DB 14. In the automatic order placement, the control unit 12 transmits to the external server 4 managing the store specified by the user, through the transmission unit 13, an instruction to deliver a predetermined quantity of products specified by the user to the home of the user. Then, the process illustrated in FIG. 6 is ended.

In the case where the quantity M+m of products stored in the repository 200 is greater than the first threshold (OP208: NO), the process proceeds to OP210. In OP210, the control unit 12 determines whether the quantity M of tagged products stored in the repository 200 is equal to or smaller than the second threshold. In the case where the quantity M of tagged products stored in the repository 200 is equal to or smaller than the second threshold (OP210: YES), the process proceeds to OP211. In OP211, the control unit 12 transmits to the user terminal 3, through the transmission unit 13, an inquiry for checking whether an order may be automatically placed. In the case where a permission response for automatic order placement is received from the user terminal 3, the control unit 12 refers to the user information DB 14 and performs automatic order placement. Then, the process illustrated in FIG. 6 is ended.

In the case where the quantity M of tagged products stored in the repository 200 is greater than the second threshold (OP210: NO), the process illustrated in FIG. 6 is ended.

Additionally, processes by the management server 1 are not limited to the processes illustrated in FIGS. 5 and 6, and may be changed as appropriate according to the embodiment. For example, in OP202, at the time of transmitting, to the user terminal 3, an inquiry as to whether an untagged product is mixed in the repository 200, an inquiry about the quantity of untagged products stored in the repository 200 may also be transmitted. In the case where a response is obtained from the user terminal 3 about the quantity of untagged products stored in the repository 200, the control unit 12 may perform the processes from OP208 or may update the stock information DB 15 by taking the quantity given in the response as the quantity of untagged products.

Figure 7:
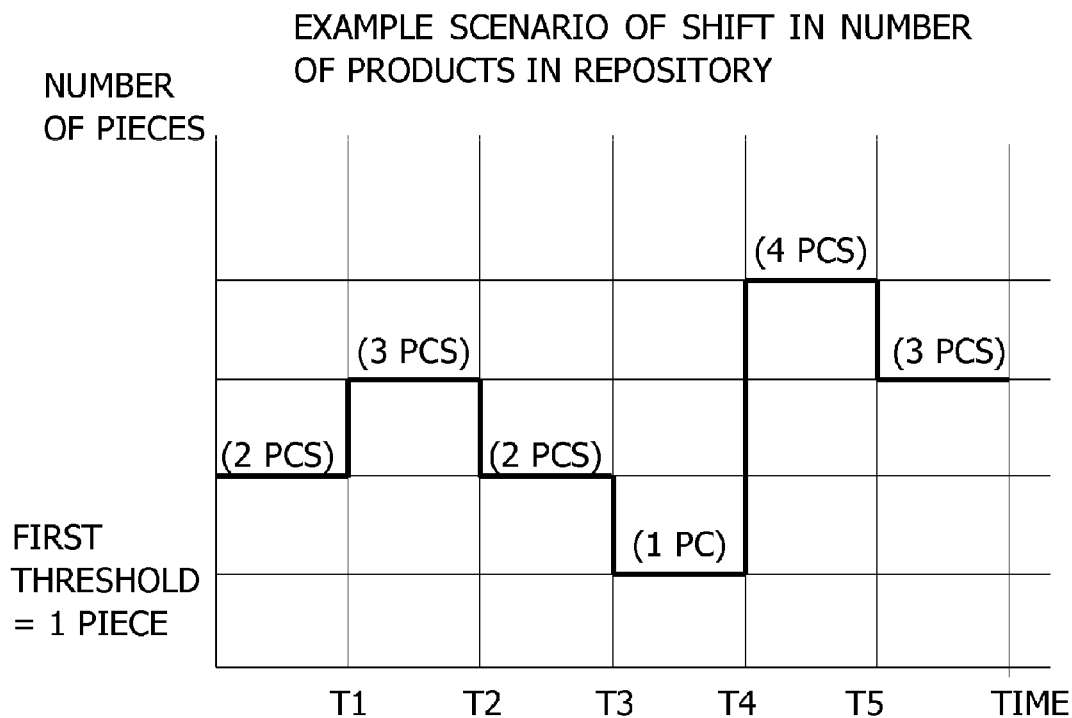
FIG. 7 is a diagram illustrating a scenario of a shift in the number of products stored in the repository.

A specific example of a shift in the quantity of products stored in the repository 200 due to stock management by the stock management system 100 will be described with reference to FIGS. 7 to 9. FIG. 7 is a diagram illustrating a scenario of a shift in the number of products stored in the repository 200. The graph and the table illustrated in FIG. 7 indicate a shift in the total number M+m of tagged products and untagged products in the repository 200. Times T0 to T5 are each a timing when a process for checking the number of products stored in the repository 200 is performed, the timings being spaced apart by a predetermined period of time. The scenario of a shift in the quantity of products stored in the repository 200 is as follows, the scenario being common between FIGS. 8 and 9.

(1) The threshold for performing automatic order placement is one piece. At the time of automatic order placement, three tagged products are ordered.

(2) At the time T0, two tagged products are stored in the repository 200.

(3) Between the time T0 and the time T1, one untagged product is added to the repository 200.

(4) Between the time T1 and the time T2, one tagged product is removed from the repository 200.

(5) Between the time T2 and the time T3, one tagged product is removed from the repository 200.

In the example illustrated in FIG. 7, the threshold for performing automatic order placement is one piece, and thus, automatic order placement is performed between the time T3 and the time T4, and three tagged products are added to the repository 200.

Figure 8:
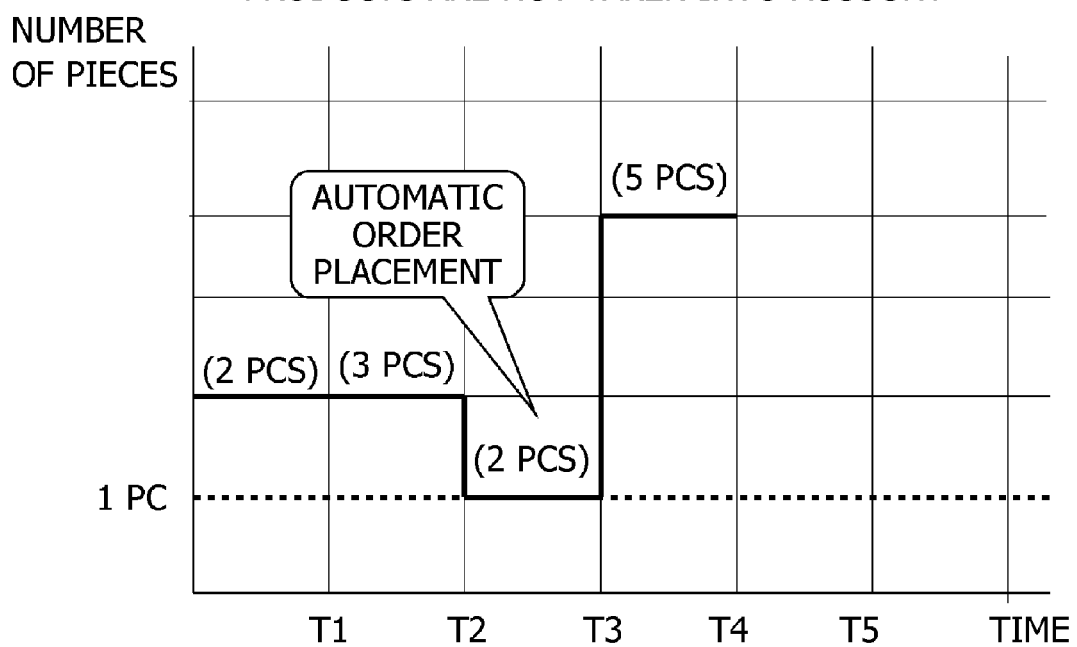
FIG. 8 is a diagram illustrating an example of a shift in the number of products stored in the repository, where untagged products are not taken into account.

FIG. 8 is a diagram illustrating an example of a shift in the number of products stored in the repository 200, where untagged products are not taken into account. In the example illustrated in FIG. 8, tagged products stored in the repository 200 are detected using the RFIDs, but untagged products are not detected even if present in the repository 200 in a mixed manner. The total number of tagged products and untagged products stored in the repository 200 is given in brackets.

In scenario (3), one untagged product is added to the repository 200 between the time T0 and the time T1, but in the example illustrated in FIG. 8, the untagged product is not detected. Accordingly, at the time T1, the number of products stored in the repository 200, detected using the RFIDs remains unchanged from the time T0 and is two, and this is recognized as it is to be the number of products stored in the repository 200. At this time point, a difference is caused between the number of products actually stored in the repository 200 (three pieces) and the number of products recognized by the system to be stored in the repository 200 (two pieces).

In the example illustrated in FIG. 8, when, in scenario (4), one tagged product is removed from the repository 200 between the time T1 and the time T2, the number of products stored in the repository 200, detected using the RFIDs becomes one at the time T2. Accordingly, at the time T2, the number of products stored in the repository 200, recognized by the system becomes one, and is thus equal to or smaller than the threshold for automatic order placement. The number of products stored in the repository 200 is actually two in total, with one tagged product and one untagged product, but the system automatically places an order for three tagged products. Accordingly, three tagged products are added to the repository 200 between the time T2 and the time T3. At the time T3, the number of products actually stored in the repository 200 is five in total, with four tagged products and one untagged product, but the system recognizes four tagged products to be stored in the repository 200 in relation to the number of products stored in the repository 200.

FIG. 9 is a diagram illustrating an example of a shift in the number of products stored in the repository 200 and managed by the stock management system 100 according to the first embodiment. In the example illustrated in FIG. 9, the solid line in the graph indicates a shift in the number M of tagged products. The dotted line in the graph indicates a shift in the total number M+m of tagged products and untagged products. The total number of tagged products and untagged products stored in the repository 200 is given in brackets. Furthermore, in the example illustrated in FIG. 9, the first threshold and the second threshold are both one piece.

When, in scenario (3), one untagged product is added to the repository 200 between the time T0 and the time T1, information about the untagged product is registered in the stock information DB 15 (for example, see FIG. 5). Accordingly, at the time T1, the number of products recognized by the management server 1 to be stored in the repository 200 is three in total, with two tagged products that are detected using the RFIDs and one untagged product, and matches the number of products actually stored in the repository 200 (three pieces).

In the example illustrated in FIG. 9, when, in scenario (4), one tagged product is removed from the repository 200 between the time T1 and the time T2, the number of tagged products stored in the repository 200, detected using the RFIDs becomes one at the time T2. Accordingly, at the time T2, the number of products stored in the repository 200, recognized by the management server 1 is two in total, with one tagged product and one untagged product. Also at the time T2, the number of products actually stored in the repository 200 (two pieces) matches the number of products recognized by the management server 1 to be stored in the repository 200.

At the time T2, the number M of tagged products stored in the repository 200 is equal to or smaller than the second threshold (that is, one piece), and thus, the management server 1 transmits, to the user terminal 3, an inquiry for checking whether an order may be automatically placed. Because a total of two pieces, one tagged product and one untagged product, are actually stored in the repository 200, the user selects rejection of automatic order placement, and a rejection response for automatic order placement is transmitted from the user terminal 3 to the management server 1. Accordingly, automatic order placement is not performed at the time T2.

In the example illustrated in FIG. 9, when, in scenario (5), one tagged product is removed from the repository 200 between the time T2 and the time T3, the number of products stored in the repository 200, detected using the RFIDs becomes zero at the time T3. Accordingly, at the time T3, the number of products stored in the repository 200, recognized by the management server 1 becomes one in total, with zero tagged product and one untagged product, and is equal to or smaller than the first threshold for automatic order placement. Accordingly, the management server 1 automatically places an order for three tagged products. Three tagged products are thus added to the repository 200 between the time T3 and the time T4.

At the time T4, the number of products stored in the repository 200 and detected using the RFIDs is three. Accordingly, at the time T4, the number of products stored in the repository 200, recognized by the management server 1 is four in total, with three tagged products and one untagged product, and matches the number of products actually stored in the repository 200 (four pieces).

As can be seen from FIGS. 8 and 9, by taking into account the quantity of untagged products mixed in the repository 200, stock management may be accurately performed according to the quantity of products actually stored in the repository 200. Furthermore, in relation to automatic order placement based on the stock quantity, if the quantity of untagged products is not taken into account, as illustrated in FIG. 8, an order is placed at a timing when an order does not have to be placed yet, thereby causing an unnecessarily large quantity of products to be stored in the repository 200. However, with the stock management by the stock management system 100 illustrated in FIG. 9, automatic order placement is performed at an appropriate timing, and the quantity of products stored in the repository 200 may be prevented from becoming unnecessarily large.

Operations and Effects of First Embodiment

In the first embodiment, the possibility of an untagged product getting mixed in the repository 200 is detected from a factual event, that is, a purchase action of the user, and in a case where an untagged product gets mixed in the repository 200, stock management is performed based on the total quantity of tagged products and untagged products. The management server 1 may thus perform stock management in better accordance with the quantity of products actually stored in the repository 200.

Furthermore, in the first embodiment, even in a case where a sensor other than the reader for RF tags is not provided at the repository 200, stock management may be performed taking into account untagged products that are present in a mixed manner. A sensor other than the reader for RF tags is a weight sensor or a camera, for example.

Furthermore, in the first embodiment, a notification is issued to the user in a case where there is a possibility of an untagged product getting mixed in the repository 200, and in a case where the quantity of tagged products stored in the repository 200 falls to or below the second threshold. The user may thus be reminded of the stock quantity in the repository 200. For example, when the user is notified of the possibility of an untagged product getting mixed in the repository 200, the user possibly stops storing the untagged product in the repository 200 and starts using the untagged product without storing the same, and in such a case, the untagged product may be prevented from getting mixed in the repository 200. For example, when the quantity of tagged products stored in the repository 200 falls to or below the second threshold and an inquiry as to whether an order may be automatically placed is received, the user may select the timing of automatic order placement on his/her own or may grasp that the quantity of products stored in the repository 200 is small.

Other Embodiments

The embodiment described above is an example, and the present disclosure may be changed and carried out as appropriate without departing from the gist of the present disclosure.

In the first embodiment, a description is given assuming that the products stored in the repository 200 are products of a same article, but products of a plurality of articles may also be stored in the repository 200. In the case where products of a plurality of articles are stored in the repository 200, stock management may be performed for each article while taking into account mixing of untagged products, by performing the processes described in the first embodiment for each article.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device comprising a processor configured to manage a stock quantity of products purchased and stored in a predetermined storage place that is associated with a user, based on information about a first product to which an electronic tag is attached, the information being acquired from a sensor in the predetermined storage place reading the electronic tag of the first product through short-range wireless communication, wherein the processor is configured to:
acquire, from the sensor reading the electronic tag of the first product, the information about the first product stored in the predetermined storage place, and acquire a quantity of the first product stored in the predetermined storage place,
detect, from an external device different from the sensor, that a second product to which the electronic tag is not attached or in relation to which whether the electronic tag is attached or not is unknown, is to be placed in the predetermined storage place together with the first product, based on purchase information indicating a purchase action of the user and being transmitted to the information processing device by the external device,
manage, in a case where the second product is present in a mixed manner in the predetermined storage place, the stock quantity of products stored in the predetermined storage place, based on the quantity of the first product and a quantity of the second product stored in the predetermined storage place, and
upon determining that the stock quantity of products stored in the predetermined storage place falls below a threshold, issue a notification to a user terminal of the user.

2. The information processing device according to claim 1, wherein the processor is configured to place an order for the first product or a predetermined product of a same type as the first product, in a case where a first stock quantity that is a total of the quantity of the first product and the quantity of the second product stored in the predetermined storage place falls to or below a first threshold.

3. The information processing device according to claim 1, wherein the processor is configured to issue an inquiry to the user associated with the predetermined storage place as to whether to place an order for the first product or a predetermined product of a same type as the first product, in a case where the quantity of the first product stored in the predetermined storage place falls to or below a second threshold.

4. The information processing device according to claim 1, wherein the processor is configured to acquire, based on the purchase information, a quantity of the second product that is newly stored in the predetermined storage place, and update the quantity of the second product stored in the predetermined storage place.

5. The information processing device according to claim 1, wherein the processor is configured to reset the quantity of the second product stored in the predetermined storage place, in a case where it is confirmed by the user associated with the predetermined storage place that the second product is not stored in the predetermined storage place.

6. The information processing device according to claim 1, wherein the processor is configured to update the quantity of the second product stored in the predetermined storage place by excluding a quantity of the second product for which there is a lapse of a predetermined period of time after being placed in the predetermined storage place.

7. The information processing device according to claim 1, wherein the processor is configured to issue a notification that the second product is to be placed in the predetermined storage place, to the user associated with the predetermined storage place, in a case where the second product is detected in the predetermined storage place.

8. The information processing device according to claim 7, wherein the processor issues to the user associated with the predetermined storage place, together with the notification, an inquiry as to whether to store the second product in the predetermined storage place.

9. An information processing method comprising managing a stock quantity of products purchased and stored in a predetermined storage place that is associated with a user, based on information about a first product to which an electronic tag is attached, the information being acquired from a sensor in the predetermined storage place reading the electronic tag of the first product through short-range wireless communication, wherein the information processing method includes:
acquiring, from the sensor reading the electronic tag of the first product, the information about the first product stored in the predetermined storage place, and acquiring a quantity of the first product stored in the predetermined storage place, detecting, from an external device different from the sensor, that a second product to which the electronic tag is not attached or in relation to which whether the electronic tag is attached or not is unknown, is to be placed in the predetermined storage place together with the first product, based on purchase information indicating a purchase action of the user and being transmitted to the information processing device by the external device, managing, in a case where the second product is present in a mixed manner in the predetermined storage place, the stock quantity of products stored in the predetermined storage place, based on the quantity of the first product and a quantity of the second product stored in the predetermined storage place, and upon determining that the stock quantity of products stored in the predetermined storage place falls below a threshold, issuing a notification to a user terminal of the user.

10. The information processing method according to claim 9, comprising placing an order for the first product or a predetermined product of a same type as the first product, in a case where a first stock quantity that is a total of the quantity of the first product and the quantity of the second product stored in the predetermined storage place falls to or below a first threshold.

11. The information processing method according to claim 9, comprising issuing an inquiry to the user associated with the predetermined storage place as to whether to place an order for the first product or a predetermined product of a same type as the first product, in a case where the quantity of the first product stored in the predetermined storage place falls to or below a second threshold.

12. The information processing method according to claim 9, comprising acquiring, based on the purchase information, a quantity of the second product that is newly stored in the predetermined storage place, and updating the quantity of the second product stored in the predetermined storage place.

13. The information processing method according to claim 9, comprising resetting the quantity of the second product stored in the predetermined storage place, in a case where it is confirmed by the user associated with the predetermined storage place that the second product is not stored in the predetermined storage place.

14. The information processing method according to claim 9, comprising updating the quantity of the second product stored in the predetermined storage place by excluding a quantity of the second product for which there is a lapse of a predetermined period of time after being placed in the predetermined storage place.

15. The information processing method according to claim 9, comprising issuing a notification that the second product is to be placed in the predetermined storage place, to the user associated with the predetermined storage place, in a case where the second product is detected in the predetermined storage place.

16. The information processing method according to claim 15, wherein an inquiry is issued, together with the notification, to the user associated with the predetermined storage place as to whether to store the second product in the predetermined storage place.

17. An information processing device comprising a processor configured to manage a stock quantity of products purchased and stored in a predetermined storage place that is associated with a user, based on information about a first product to which an electronic tag is attached, the information being acquired from a sensor in the predetermined storage place reading the electronic tag of the first product through short-range wireless communication, wherein
the processor is configured to:
detect, from an external device different from the sensor, that a second product to which the electronic tag is not attached or in relation to which whether the electronic tag is attached or not is unknown, is to be placed in the predetermined storage place together with the first product, based on purchase information indicating a purchase action of the user and being transmitted to the information processing device by the external device, and issue a notification that the second product is to be placed in the predetermined storage place together with the first product, to the user associated with the predetermined storage place, in a case where the second product is detected in the predetermined storage place.

18. The information processing device according to claim 17, wherein the processor issues to the user associated with the predetermined storage place, together with the notification, an inquiry as to whether to store the second product in the predetermined storage place.

19. The information processing device according to claim 17, wherein the processor is configured to:
acquire, from the electronic tag of the first product, the information about the first product stored in the predetermined storage place, and acquire a quantity of the first product stored in the predetermined storage place, and manage, in a case where the second product is present in a mixed manner in the predetermined storage place, the stock quantity of products stored in the predetermined storage place, based on the quantity of the first product and a quantity of the second product stored in the predetermined storage place.

20. The information processing device according to claim 19, wherein the processor is configured to place an order for the first product or a predetermined product of a same type as the first product, in a case where a first stock quantity that is a total of the quantity of the first product and the quantity of the second product stored in the predetermined storage place falls to or below a first threshold.

* * * * *